UNITED STATES PATENT OFFICE.

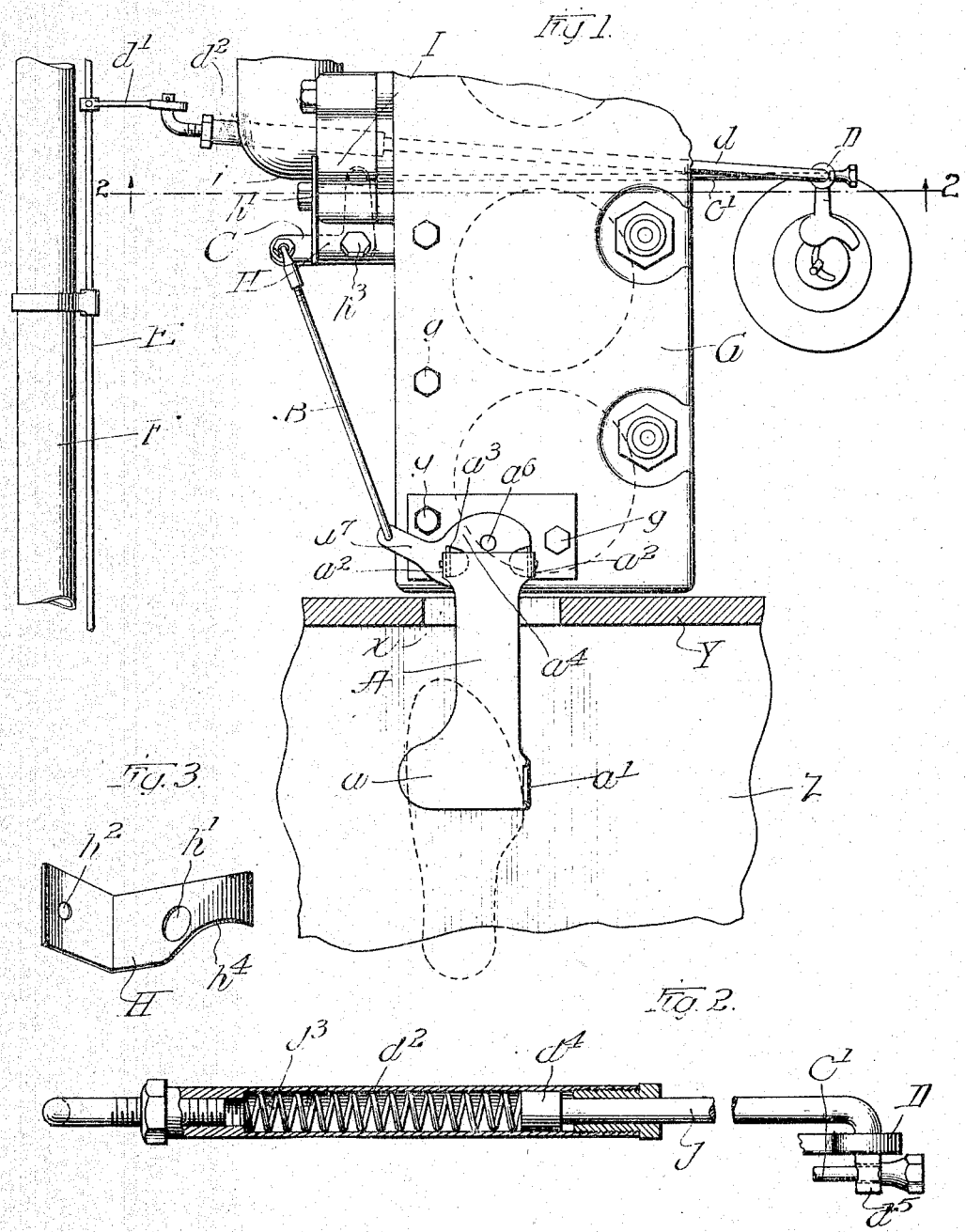

CHRISTIAN F. HESS, OF CHICAGO, ILLINOIS, ASSIGNOR TO ALEXANDER NELSON, OF CHICAGO, ILLINOIS.

ACCELERATOR.

1,174,981.  Specification of Letters Patent.  Patented Mar. 14, 1916.

Application filed August 26, 1914. Serial No. 858,60.

*To all whom it may concern:*

Be it known that I, CHRISTIAN F. HESS, a citizen of the United States of America, and resident of Chicago, Illinois, (address care of A. Nelson Mfg. Co., 564-72 West Randolph street, Chicago, Illinois.) have invented a certain new and useful Improvement in Accelerators, of which the following is a specification.

My invention relates to devices for accelerating the speed of an automobile or similar engine. Ordinarily this is done by means of a foot pedal which is connected with the throttle valve of the engine, and which is employed in addition to the hand throttle which is usually associated with the steering wheel. The purpose of this arrangement is to render it possible to accelerate the speed of the engine at will and without disturbing the adjustment of the hand throttle on the steering wheel. As soon as the foot is removed from the pedal the engine then returns to the speed determined by the adjustment of the hand throttle.

Generally stated, the object of my invention is to provide a novel and simple and highly efficient accelerator of the foregoing general character.

Special objects are to provide a construction and arrangement whereby the said accelerator can be attached in place by bolts or similar means involved in the construction of the engine whereby the application of the accelerator to the automobile is simplified and rendered less expensive than heretofore; to provide a novel construction and arrangement whereby the vibration of the car while traveling over rough roads will not disturb the accelerator, and will not affect the speed of the automobile; and to provide certain details and features of construction tending to increase the general efficiency and desirability of an accelerator of this particular character.

To the foregoing and other useful ends my invention consists in matters hereinafter described and claimed, but I do not limit myself to the exact construction disclosed.

In the accompanying drawings Figure 1 is a plan view, more or less diagrammatic in character, showing the engine and adjacent parts of an automobile equipped with an accelerator embodying the principles of my invention. Fig. 2 is an enlarged detail section on line 2—2 in Fig. 1 and Fig. 3 is a detailed perspective view.

As thus illustrated, my invention comprises a foot member A which consists of a sheet metal plate provided with a foot engaging portion $a$ having an upturned lug $a^1$ at the right hand edge thereof. This plate has its forward end provided with a pair of parallel and downwardly extending ears $a^2$ which are pivoted to the upturned ears $a^3$ of the plate $a^4$, which latter is also formed from sheet metal. The bracket plate $a^5$ has a pivotal connection $a^6$ with said plate $a^4$, whereby the latter turns about a vertical axis. The arm $a^7$ is integral with the plate $a^4$ and is connected by a rod B with one arm of the bell-crank C, which latter is pivoted at $c$ to turn about a vertical axis. The throttle D of the engine turns about a vertical axis and is connected by a rod $d$ with the arm $d^1$, which latter is mounted on the rod E which is associated with the column F of the steering wheel in the usual and well known manner. The said rod E is connected with a suitable hand operated device on the steering wheel and constitutes a controller for the throttle, said device being of such character, it will be understood, that this rod or controller E can be turned to hold the throttle D in any desired position, thus maintaining the engine at a certain speed. By reason of the spring device $d^2$ the rod $d$ can move endwise toward the left without affecting the controller rod E, as the compression of this spring within the cylinder $d^3$, which latter is connected with the arm $d^1$ does not affect the hand throttle. The said rod $d$ is, however, provided with a shoulder $d^4$ which prevents relative movement between said rod and cylinder $d^3$ when the hand throttle is operated to control the engine. A rod $c^1$ connects the downturned end portion $d^5$ with the other arm of the bell-crank lever C, whereby the foot member A controls the engine throttle. The said member A extends through a horizontal slot X in the dash Y of the automobile and is disposed over the inclined foot board Z of the automobile body. The pivotal connections between the ears $a^2$ and $a^3$ permit the member A to rest on the said foot board Z, the foot portion $a$ being depressed and held on the foot board by the foot of the driver. When it is desired to accelerate the engine, the foot is moved sidewise against the lug $a^1$, thereby causing the arm $a^7$ to swing about the vertical axis $a^6$ in a direction which causes the rod B to exert a pull through the bell-crank C and rod $c^1$ on the throttle arm D of the engine. This accelerates the engine to some extent, and at such time the rod $d$ moves to the left, but the yielding of the spring $d^2$ prevents this operation from disturbing the hand throttle, in the manner previously described. As soon as the foot portion of the member A is released by the foot, the spring $d^2$ then restores the throttle and the accelerator to their original positions, thus the hand throttle can be adjusted to any desired position, and this adjustment is not disturbed when the accelerator is operated by the foot for the purpose of suddenly increasing the speed of the engine as is necessary, very often, when traveling through crowded streets.

In accordance with my invention, the plate $a^5$ is fastened to the engine G by means of bolts $g$ which are already on the engine—that is to say, these bolts are found on the engines of automobiles of certain types such for example as the Ford automobile. This is also true of the bracket plate H upon which the bell-crank C is pivoted, this plate being L-shaped in character is secured in place by a bolt $h$ which is found on the engine. In this type of automobile, the bolts $g$ are the regular cylinder head bolts, and the bolt $n$ is one of the bolts usually employed for holding the well known water inlet connection I in place on the side of the engine. This bracket H is, therefore, of the shape shown in Fig. 3, having an opening $n^1$ for the bolt $n$ and an opening $n^2$ for the pivot bolt $n^3$ of the said bell crank. A curved notch $n^4$ in one edge of the bracket H permits the same to fit snugly at one side of the portion $z$ of the said water inlet. It will also be observed that the rods $c^1$ and Z extend across between the cylinders of the engine, the steering wheel being at the left. The opening X is also found on a machine of this type. As stated, therefore, the accelerator embodying the principles of my invention is adapted to be secured in place without altering the construction of the automobile, and by means of devices found thereon.

What I claim as my invention is:—

1. In an automobile, and in combination with the dash and engine thereof, an engine accelerator comprising a horizontally movable foot member extending through the dash, means in front of said dash to support said member, and a connection from said member to the throttle of the engine, said dash having an opening for the lateral motion of said member.

2. In an automobile, and in combination with the dash and engine thereof, an engine accelerator comprising a horizontally movable foot member extending through the dash, a connection from said member to the throttle of the engine, said member being mounted to swing about a vertically disposed axis in front of said dash, and having a rear portion upon which the foot is placed, which portion has an upturned lug for engaging the side of the foot, said dash having an opening for the lateral motion of said member.

3. In an automobile, and in combination with the dash and engine thereof, an engine accelerator comprising a horizontally movable foot member, a connection from said member to the throttle of the engine, said member being also pivoted at its front end to swing up and down about a horizontal axis, and arranged to rest on the floor or foot board of the automobile body.

4. In an automobile, and in combination with the dash and engine thereof, an engine accelerator comprising a horizontally movable foot member, a connection from said member to the throttle of the engine, said member having a vertically disposed pivot and a lateral crank arm, and said connection including a bell crank, a rod extending from said arm to said bell crank, and a rod extending transversely of the engine from the bell crank to the engine throttle.

5. In an automobile, and in combination with the dash and engine thereof, an engine accelerator comprising a horizontally movable foot member, a connection from said member to the throttle of the engine, said member including a foot plate having its forward end provided with a pair of downturned ears, the rear end of said plate having an upturned lug to engage the side of the foot, a bracket plate fastened to the engine by bolts thereof, a crank arm pivoted on said bracket plate, movable about a vertically disposed axis, and means for pivoting said foot plate on said crank arm, whereby said foot plate swings up and down about a horizontally disposed axis.

6. In an automobile, and in combination with the dash and engine thereof, an engine accelerator comprising a horizontally movable foot member, a connection from said member directly to the throttle of the engine, a hand throttle controller, and a separate yielding connection between said controller and the engine, extending transversely of the engine, whereby the foot member may be operated to accelerate the engine without disturbing the adjustment of said controller.

7. In an automobile, and in combination with the dash and engine thereof, an engine accelerator comprising a horizontally movable foot member, a connection from said member to the throttle of the engine, said member having a bracket plate rigidly secured to the engine by the usual and regular bolts thereof.

8. In an automobile, and in combination with the dash and engine thereof, an engine accelerator comprising a horizontally movable foot member, and a connection from said member to the throttle of the engine, said member having means to provide both vertical and horizontal axes of adjustment thereof.

9. In an automobile, and in combination with the dash and engine thereof, an engine accelerator comprising a horizontally movable foot member, and a connection from said member to the throttle of the engine, said member being mounted on the top of said engine and held in place by the regular cylinder head bolts.

10. In an automobile, and in combination with the dash and engine thereof, an engine accelerator comprising a movable foot member, and a connection from said member to the throttle of the engine, said member being mounted on the engine, the entire acceleration being supported on the engine.

11. In an automobile, and in combination with the dash and engine thereof, an engine accelerator comprising a movable foot member, and a connection from said member to the throttle of the engine, said connection having a bell crank supported in position by the usual and regular fastening bolt of the water inlet connection of the engine.

12. In an automobile, and in combination with the dash and engine thereof, an engine accelerator comprising a movable foot member, and a connection from said member to the throttle of the engine, said connection including a bell crank, and a supporting bracket for said bell crank, said bracket having a bottom portion to which said bell crank is pivoted, being secured in position by the usual and regular bolt of the water inlet connection of the engine.

Signed by me at Chicago, Illinois, this 7th day of August 1914.

CHRISTIAN F. HESS.

Witnesses:
ROSE E. SEHNEM,
ARTHUR L. DURAND.